US005793595A

United States Patent [19]
Schweitzer, III et al.

[11] Patent Number: 5,793,595
[45] Date of Patent: Aug. 11, 1998

[54] MULTI-APPLICATION RELAY FOR POWER SYSTEMS

[75] Inventors: Edmund O. Schweitzer, III, Pullman, Wash.; Stanley E. Zocholl, Holland, Pa.

[73] Assignee: Schweitzer Engineering Laboratories, Inc., Pullman, Wash.

[21] Appl. No.: 527,287

[22] Filed: Sep. 12, 1995

Related U.S. Application Data

[63] Continuation of Ser. No. 105,859, Aug. 11, 1993, abandoned.
[51] Int. Cl.$^6$ ..................................................... H02H 3/00
[52] U.S. Cl. ....................................... 361/97; 361/80
[58] Field of Search ............................... 361/57, 78–80, 361/87, 93–97, 115

[56] References Cited

U.S. PATENT DOCUMENTS 5,185,705  2/1993  Farrington .................... 361/115

Primary Examiner—Ronald W. Leja
Attorney, Agent, or Firm—Jensen & Puntigam, P.S.

[57] ABSTRACT

A microprocessor-based multifunction overcurrent relay for protecting power systems has a plurality of overcurrent elements implemented in a software program. Sufficient overcurrent elements are provided to accomplish a selected one of three independent applications, including feeder protection, motor protection, or breaker failure protection. The relay includes elements for selecting one application by the user from the three possible applications and produces output signals when an overcurrent condition is determined.

6 Claims, 2 Drawing Sheets

MULTI-APPLICATION RELAY FOR POWER SYSTEMS

This is a continuation of application Ser. No. 08/105,859, filed on Aug. 11, 1993 now abandoned.

TECHNICAL FIELD

The present invention relates generally to protective relays for power systems and more particularly concerns a multifunction relay having a capability of more than one application.

BACKGROUND OF THE INVENTION

In power system protective relays generally, overcurrent protection is widely used. Historically, a large number of overcurrent relays have been developed and used for power system protection. Until recently, such overcurrent relays, as well as other protective relays, were electromechanical. The individual overcurrent elements used in electromechanical relays to respond to applied currents and produce an indication of overcurrent conduction included, among others, plunger elements, induction disk elements, pneumatic delay elements and induction cup elements. All of those elements make use of a mechanical phenomenon of the particular element to operate with a desired relay characteristic, i.e. to respond to overcurrent conditions in a particular known way.

For instance, some overcurrent elements have an inverse time characteristic, by which the element responds faster to high currents and more slowly to lower currents. Further, with certain elements, families of operating characteristics, known as relay curves, were developed for a number of different relay applications. In addition, special overcurrent elements were designed to cover particular specialized applications. As one example, for protection against failure of the power line circuit breaker, known as breaker failure protection, the overcurrent elements have very rapid pickup and dropout functions.

Electromechanical overcurrent elements are discrete elements, i.e. each function or response characteristic required for a particular protection application requires a physically separate element having the desired response characteristic. Originally, each relay overcurrent element was packaged separately, i.e. in physically separate relays. Later, two or more discrete elements with different overcurrent characteristics were housed in a single relay. This was the beginning of the multifunction relay, i.e. a single relay having two or more different functional responses covering different aspects of the particular application. A typical particular protective application required several discrete relays, or one or more (depending on the particular functions required) multifunction relays.

With the advent of microprocessor-based relays, in which the respective functions of the discrete relay overcurrent elements, previously implemented as hardware, were implemented in software, protective relays become truly multifunction. With these microprocessor-based relays, a large number of individual overcurrent functional "elements" (as many as the application required) could be conveniently implemented in one relay. This approach typically resulted in considerable cost savings to the customer relative to the previous electromechanical relays.

In both the electromechanical and microprocessor-based relays, currents from the power signal are obtained and current transformers are used to decrease the currents to an acceptable testing level. Further, both electromechanical and microprocessor-based relays produce output signals for specific purposes, such as tripping a circuit breaker when the current on the power line reaches a threshold level. Between the input and the output, however, the microprocessor-based relay is significantly different than the previous electromechanical relay, using a variety of signal filtering and processing techniques to implement overcurrent element functional characteristics as opposed to the electromechanical discrete elements so as to accomplish the evaluation of the input signals against threshold values and make a determination as to whether an output trip signal is necessary.

Even though microprocessor-based multifunction relays have been in existence for at least ten years, and are now widely accepted, such relays are still application-specific, like the previous electromechanical relays, i.e. each relay is directed toward a particular application, such as for instance, feeder line protection, motor protection, breaker protection, transmission line thermal overload protection and others. This has the disadvantage of requiring the customer and its staff, such as the power utilities, to be familiar with a large number of relays, both for installation and servicing, because of the large number of different applications of each customer. Further, the relay manufacturer must develop engineering and support services for the development and servicing of each separate application-specific relay. However, even though the above disadvantages do exist, the power industry has historically and consistently been application-specific in its use of protective relays.

SUMMARY OF THE INVENTION

Accordingly, the invention is a multi-application overcurrent protective relay for use with power systems, comprising: means for measuring the current in the power system; means for selecting one of a plurality of possible relay applications for which appropriate functional elements are available in the relay; means for grouping selected functional elements in the relay which together accomplish the selected application; means for processing the measured current with said functional elements to determine an overcurrent condition for said selected application; and means for developing an output signal when an overcurrent condition is determined to exist for said selected application.

BEST MODE FOR CARRYING OUT THE INVENTION

Figure 1:
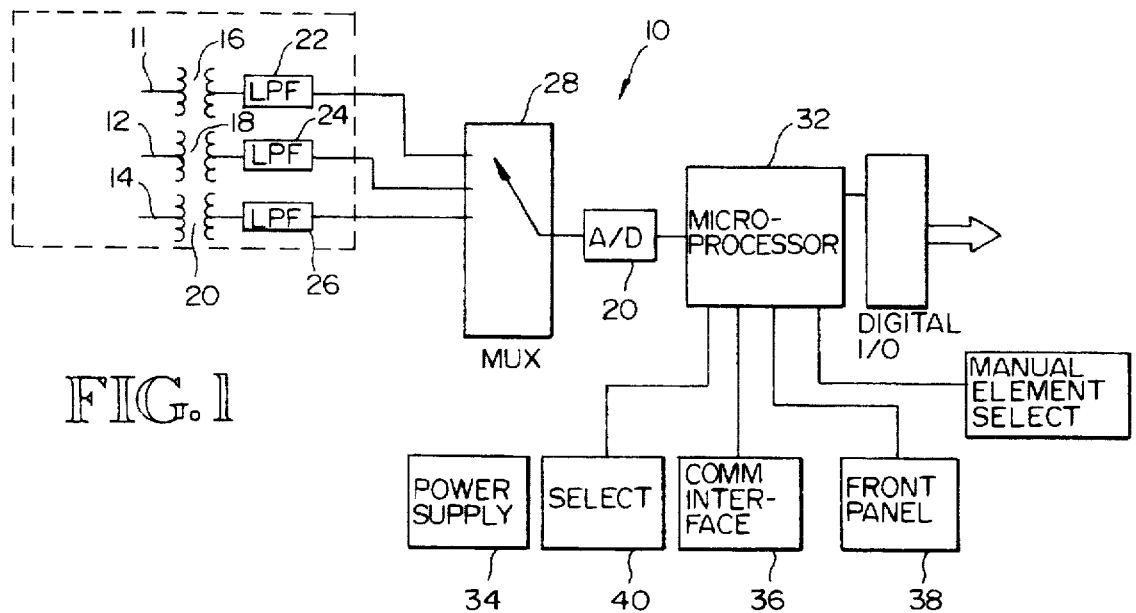
FIG. 1 is a general block diagram of a multifunction microprocessor-based relay.

FIG. 1 is a simplified block diagram showing the multifunction, multi-application relay 10 of the present invention. Three-phase current (phases A, B, C) from a power line or other source is first obtained, typically from current transformers on the power line, and applied on input relay lines 11, 12 and 14. The three currents are applied to relay input current transformers (CTs) 16, 18 and 20, which are usually 50:1 stepdown transformers, typically producing 0.1 amperes at the secondaries thereof for full load current on the power line. The signals from the input current transformers are then applied to low pass filters 22, 24 and 26 and then to a multiplexer 28. The signals from the multiplexer are applied to an A/D converter 20 and then to a microprocessor 32, which processes the signals in accordance with a software program stored thereon. This is all generally conventional for a microprocessor-based computer relay.

The software program in the microprocessor 32 of the present invention, however, includes a large number of individual overcurrent "elements", i.e. overcurrent element functions implemented in software, along with associated logic, useful for multiple applications, and further includes the capability of grouping several of these individual overcurrent elements to accomplish any one of three distinct, unrelated applications, at the user's selection. The embodiment shown includes the appropriate overcurrent elements to accomplish feeder line protection for power systems, motor protection or breaker failure protection. However, it should be understood that other specific overcurrent applications may also be included, such as, for instance, transmission thermal overload protection. The relay of the present invention is thus a multi-application, multifunction microprocessor-based relay which includes the capability of grouping individual functional overcurrent elements, and associated logic, to accomplish any one (at a time) of three possible applications.

Referring still to FIG. 1, the relay also includes a power supply 34, a communications interface 36 and a front panel arrangement 38. For clarity, element 40 is shown separately for selection of a particular application, from the three available, by a user. Lastly, the apparatus includes an input/output interface which produces output signals from the relay for control of circuit breakers and the like.

Figure 2:
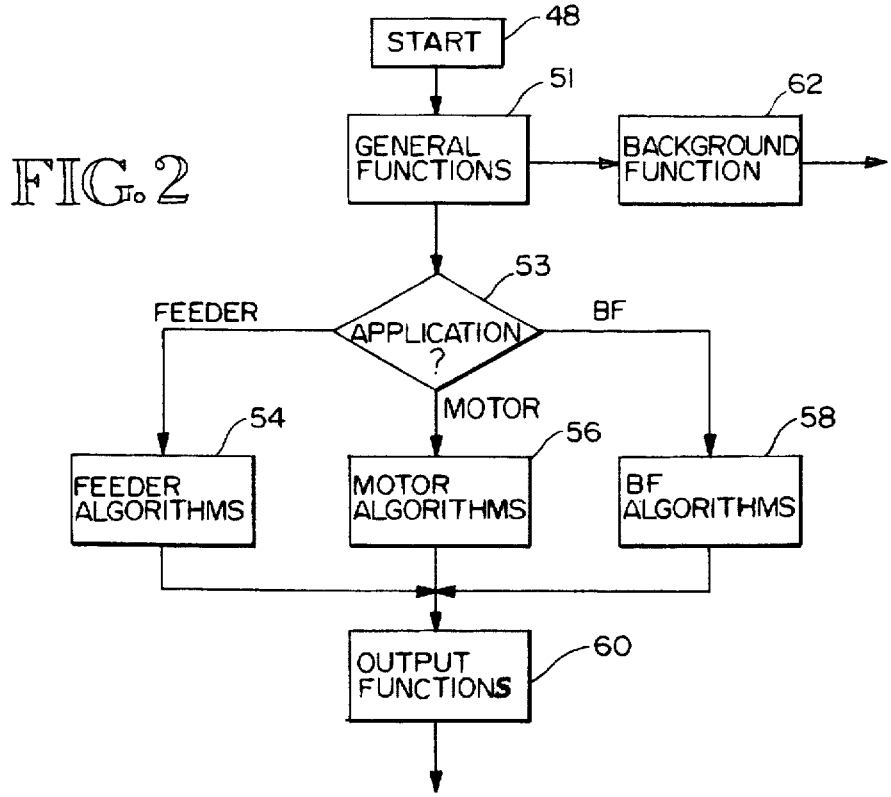
FIG. 2 is a general block diagram of the processing flow in the microprocessor of the relay of the present invention.

FIG. 2 shows in simplified form the processing flow in the microprocessor 32. The microprocessor begins operations with a conventional start-up routine, shown at block 48, then moves through general functions which are common to all three applications, including acquisition of data, every 1/16th of a cycle in the embodiment shown, and filtering the data digitally. This is shown as block 51. At this point, an inquiry is made as to the particular application selected by the user, as shown in block 53. Again, in the embodiment shown, the three choices are feeder protection, motor protection and breaker failure protection. Each of these protection applications are well known. In each case, the software in the microprocessor will execute a set of algorithms particularized, respectively, for feeder protection (block 54), motor protection (block 56) or breaker failure protection (block 58). At the end of the processing cycle for the selected application, general output functions are performed, if necessary, as shown at block 60, including control of relay outputs, and saving of any data.

Event reports for any out-of-tolerance input signals are also produced.

In addition to the above, the software in the microprocessor will execute other support functions, referred to as background functions, shown at block 62. These background functions include in the embodiment shown, metering information, self-test information, display of selected event reports, and relay setting functions. Other general support functions could be implemented as well.

Figure 3:
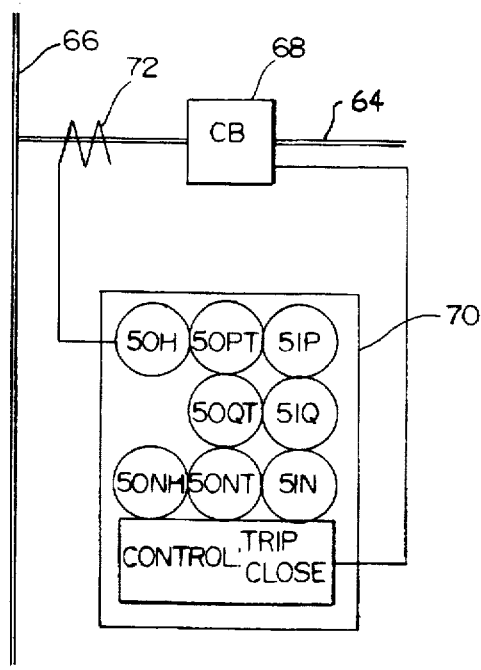
FIG. 3 is a diagram showing the various individual relay elements in the relay of the present invention used to protect a feeder line.
Figure 4:
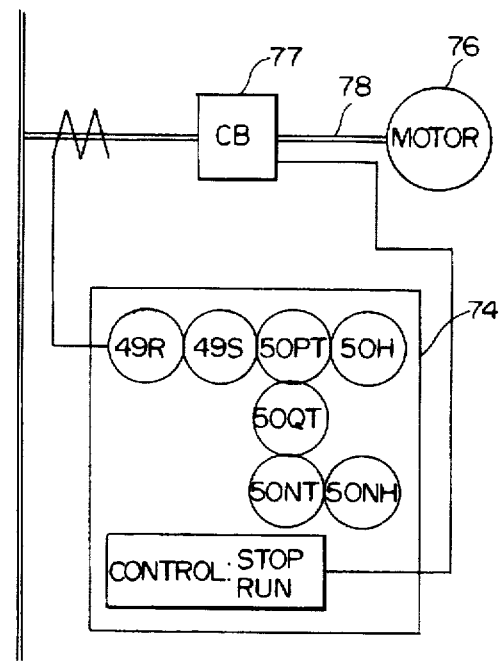
FIG. 4 is a diagram showing the various individual relay elements present in the relay of the present invention used to protect a motor.
Figure 5:
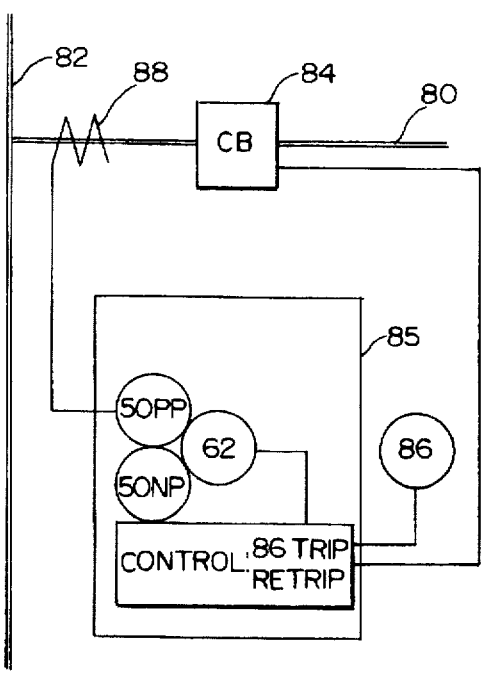
FIG. 5 is a diagram showing the various individual relay elements present in the relay of the present invention used for breaker failure protection.

FIGS. 3, 4 and 5 show the individual functional overcurrent "elements" which are grouped together for each application of the embodiment shown. The grouping of functional elements for the selected application is accomplished automatically by the relay following selection thereof by the user. FIG. 3 is directed toward overcurrent protection for feeder lines. Feeder line 64 is shown as extending from a distribution bus 66. Feeder line 64 has a circuit breaker 68 associated therewith. Relay 70 is shown as receiving three phase input signals from current transformers (shown as a group at 72) which are responsive to current on feeder line 64.

The relay 70 in the feeder protection application mode includes a total of eight different overcurrent elements (the individual elements in FIGS. 3, 4 and 5 are shown with industry nomenclature), including three phase overcurrent elements, two negative sequence overcurrent elements and three residual overcurrent elements. The phase elements include one instantaneous overcurrent element (50H) for each phase of the power signal, one definite time overcurrent element (50PT) for each phase and one inverse time overcurrent element (51P) for each phase. The negative sequence overcurrent elements include a definite time overcurrent element (50QT) and an inverse time element (51Q). The residual current overcurrent elements include an instantaneous overcurrent element (50NH), a definite-time residual overcurrent element (50NT), and an inverse time overcurrent element (51N). The operating characteristics of each of these elements are well known and are implemented in software in the microprocessor. Outputs include trip signals and "close" signals (for the circuit breaker) which are applied to circuit breaker 68.

FIG. 4 shows the grouping of overcurrent elements associated with motor protection. The relay 74 is shown protecting a motor 76 which is powered by a feeder line 78. circuit breaker 77 protects the motor. Motor protection includes two phase overcurrent elements, a negative sequence element, two residual current elements and two thermal elements. The phase overcurrent elements include an instantaneous overcurrent element (50H) and a definite time overcurrent element (50PT)for each phase. The negative sequence element is a definite time overcurrent element (50QT). The residual current elements are an instantaneous overcurrent element (50NH) and a definite time overcurrent element (50NT). The motor protection further includes a rotor thermal element (49R) and a stator thermal element (49S). Outputs include stop and run outputs which are connected to circuit breaker 77. Further information concerning the specific structure of a particular motor protection relay configuration using thermal elements is set forth in copending U.S. patent application Ser. No. 08/105,009, filed Aug. 11, 1993, titled "Motor Protection Relay Using Rotor and Stator Thermal Models," in the names of Edmund O. Schweitzer III and Stanley Zocholl, and assigned to the same assignee as the present invention. The contents of said application are hereby incorporated by reference.

FIG. 5 shows the grouping of overcurrent elements for breaker failure protection. Feeder line 80 extends from a distribution bus 82, with the feeder line having a circuit breaker 84 associated therewith. The breaker failure relay 85 receives samples of current from feeder line 80 from current transformers 88. The relay arrangement includes phase overcurrent elements and residual overcurrent elements. The phase elements include instantaneous overcurrent elements (50PP) for each phase and the residual element includes an instantaneous overcurrent element (50NP). The breaker failure protection group also includes a timer (62). Outputs include trip and re-trip commands. The re-trip output is directed to the circuit breaker, in case the failure of the circuit breaker to trip is a connecting line problem. The trip output occurs a short time later if the breaker still fails to trip. The trip output goes to a lock-out relay (industry nomenclature 86) which in turn trips all the breakers on the distribution bus. Further detailed information concerning a breaker failure protective relay is set forth in U.S. Pat. No. 5,157,575, issued on Oct. 20, 1992 and assigned to the same assignee as the present invention, the contents of which are hereby incorporated by way of reference.

Hence, a microprocessor-based, multifunction relay has been disclosed which includes a sufficient functional element capability and a capability for grouping selected ones of the various elements to accomplish a selected one of a plurality of unrelated, independent relay applications. In the preferred embodiment, there are three applications possible, including feeder protection, motor protection and breaker failure protection, although other applications could be included as well. The present invention thus has the advantage of decreasing the number of different relays purchased by a customer, without significant, if any, increase in total cost. Servicing, maintenance and support will thus be simplified and streamlined, as will manufacturing and manufacturing support.

Although in the embodiment shown, it is the relay itself which groups together preselected functional elements for each application, it is possible to arrange the functional element selection capability such that the user can select all of the functional elements to implement one of the three applications.

Although a preferred embodiment has been disclosed herein for purposes of illustration, it should be understood that various changes, modifications and substitutions may be incorporated in the embodiment without departing from the spirit of the invention which is defined by the claims which follow.

We claim:

1. A multi-application overcurrent protective relay for use with power systems, comprising:

means for obtaining values of power system current;

means readily accessible by an operator of the protective relay for selecting one of a plurality of possible relay applications for which appropriate functional overcurrent elements are available in the relay, wherein each selected relay application requires a different plurality of functional overcurrent elements;

means responsive to said operator accessible selecting means for automatically selecting and grouping a plurality of separate functional overcurrent elements in the relay which together accomplish the selected relay application, wherein the possible relay applications are sufficiently different that there are substantial differences between the groupings of overcurrent elements, at least one grouping including a plurality of overcurrent elements not present in at least one of the other groupings and vice versa;

means for processing the obtained values of current with said plurality of functional overcurrent elements to determine an overcurrent condition for said selected relay application; and means for developing an output signal when an overcurrent condition is determined to exist for said selected relay application.

2. An apparatus of claim 1, wherein the possible applications include at least two of (a) feeder line protection, (b) motor protection and (c) breaker failure protection.

3. An apparatus of claim 1, wherein the power system currents are sampled several times per cycle.

4. An apparatus of claim 1, including means responsive to the output signal to trip a circuit breaker associated with the power system.

5. An apparatus of claim 1, wherein the functional overcurrent elements are implemented in software and wherein the processing means is a microprocessor controlled by said software.

6. An apparatus of claim 1, including means for manually selecting a combination of overcurrent elements available in the relay for a relay application.

* * * * *